United States Patent [19]
Keith

[11] 3,791,214
[45] Feb. 12, 1974

[54] DIGITAL CLINICAL THERMOMETER

[76] Inventor: Arlie L. Keith, 1815 Gerda Ter., Orlando, Fla. 32804

[22] Filed: Aug. 10, 1971

[21] Appl. No.: 170,468

[52] U.S. Cl. ........................................... 73/362 AR
[51] Int. Cl. .............................................. G01k 7/24
[58] Field of Search .................................. 73/362 AR

[56] References Cited
UNITED STATES PATENTS

| | | | |
|---|---|---|---|
| 3,729,998 | 5/1973 | Mueller et al. | 73/362 AR |
| 3,025,706 | 3/1962 | Oppenheim | 73/362 AR |
| 3,540,283 | 11/1970 | Dean | 73/362 AR |
| 3,461,724 | 8/1969 | Tong et al. | 73/362 AR |
| 3,477,292 | 11/1969 | Thornton | 73/362 AR |
| 3,620,082 | 11/1971 | Peters | 73/362 AR |
| 3,311,842 | 3/1967 | Beck | 73/362 AR |
| 3,296,866 | 1/1967 | Zenmon et al. | 73/362 AR |

Primary Examiner—Richard C. Queisser
Assistant Examiner—Frederick Shoon
Attorney, Agent, or Firm—Jack N. McCarthy

[57] ABSTRACT

A counter is preset to a count that represents a temperature slightly below a range of clinical interest. The counter is incremented by a gated oscillator, in response to the output of a thermistor bridge, thereby augmenting the content of the counter so that its count is representative of the temperature of the thermistor. The content of the counter is displayed visually, in a serial digit-by-digit manner, on a display device. The time required for the thermistor to reach the temperature that is being measured is shortened by preheating the thermistor to a temperature within the range of clinical interest.

7 Claims, 2 Drawing Figures

DIGITAL CLINICAL THERMOMETER

BACKGROUND OF THE INVENTION

This invention relates to thermistor bridge thermometers and more particularly to a preheated thermometer wherein temperature is read serially on a display device.

DESCRIPTION OF THE PRIOR ART

Thermistors, particularly of the type made from barium titanate, have long been used as temperature sensing devices. Thermistors of this type provide an electrical resistance which has a non-linear negative temperature coefficient. With slight variations in construction, a thermal span over which the thermistor resistance varies linearly with temperature can be placed within a wide range of temperatures. It is not a difficult problem to obtain a thermistor that has a resistance which varies linearly with temperature over the narrow span of clinical interest, such as the temperature of a human subject or any warmblooded animal. These devices have the further advantage of being capable of very small physical construction and having a thermal time constant much smaller than what is customarily encountered in mercury thermometers.

In many applications, the time it takes to obtain the temperature of a human or animal is often of critical importance. The length of time required for taking the precise temperature of a subject with a mercury thermometer is approximately 3 minutes; an inconvenient length of time in the case of a very sick animal or human.

Electronic thermometers used in the prior art employ thermistor bridge circuits which are balanced by an operator who varies the resistance of one arm of the bridge and reads the temperature from a graduated scale where the reading is indicated by a pointer associated with the variable resistance arm. These thermometers may be calibrated to a high degree of accuracy but a substantial amount of time may be required for the manipulation of the variable resistance arm of the bridge. Other types of thermometers employing meter readouts often are inconvenient because the patient may also see the reading, a factor which could have depressing psychological effects.

A temperature sensor disclosed by J. M. Dean in U.S. Pat. No. 3,540,283 discloses a thermometer which is preheated to approximately the thermal range of interest by a separate proportional controller which senses ambient temperature. However, the temperature sensor disclosed therein requires manual adjustment by an operator in obtaining a reading.

Of the clinical thermometers known to the prior art, they are either of slow response, are difficult to read and are often of a bulky, inconvenient construction.

SUMMARY OF THE INVENTION

An object of the present invention is to provide a thermometer with faster response than those heretofore known to the prior art.

A further object of the present invention is to provide a thermometer of novel construction wherein a temperature may be read conveniently and automatically.

According to the invention, a digital clinical thermometer comprises a resistance sensing bridge circuit using a variable resistance transducer wherein the output of said bridge circuit causes a circuit to generate groups of pulses, the number of pulses in a group being proportional to the resistance of said transducer. A counter, preset to a count representative of a transducer resistance slightly lower than the range of interest, as compared to the ambient transducer resistance when incremented by said group of pulses, causes said counter to store a count representative of the transducer resistance being measured.

In further accord with the invention, a measurement apparatus comprises a variable resistance transducer and pulse generating means generating a train of pulses, the number of which is proportional to the resistance change of said transducer. Said train of pulses is used to increment a counter that has been preset to a count close to, but below, the count representative of the lowest reading to be obtained from said apparatus.

In further accord with the invention, a measurement apparatus is provided wherein said transducer is a temperature sensitive transducer, said transducer is preheated to a temperature close to the temperature expected to be measured.

In further accord with the invention, a temperature measurement device is provided wherein the digits comprising the temperature are provided visually, in a serial manner, by a display device.

The digital clinical thermometer may be constructed from medium scale integrated circuits and other integrated circuits of monolithic construction and small enough so that a display device may be mounted on the probe, readable by the operator but not the patient.

Preheating of the thermistor probe to a temperature close to the thermal range of interest causes a thermal gradient between the probe and an unknown temperature to be small, thereby reducing the time required for the probe to reach thermal equilibrium with an environment having the unknown temperature. The thermal contact surface of the probe may therefore be constructed of relatively large size since the preheating of the probe mitigates the effects of a somewhat larger thermal time constant. The larger construction is desirable because a greater sensing area reduces effects of small hot spots such as a region near a blood vessel where temperature may be slightly elevated above average environmental temperature.

The principle which enables a monitored temperature to be read in digital form by one using the invention, resides in varying the period of a monostable multivibrator with a voltage which is proportional to the change in resistance; in this embodiment, a temperature sensitive transducer. Other transducers, such as strain gages and humidity sensors, can be used to measure other phenomena in similar embodiments of the invention.

DESCRIPTION OF THE PREFERRED EMBODIMENT

Figure 1:
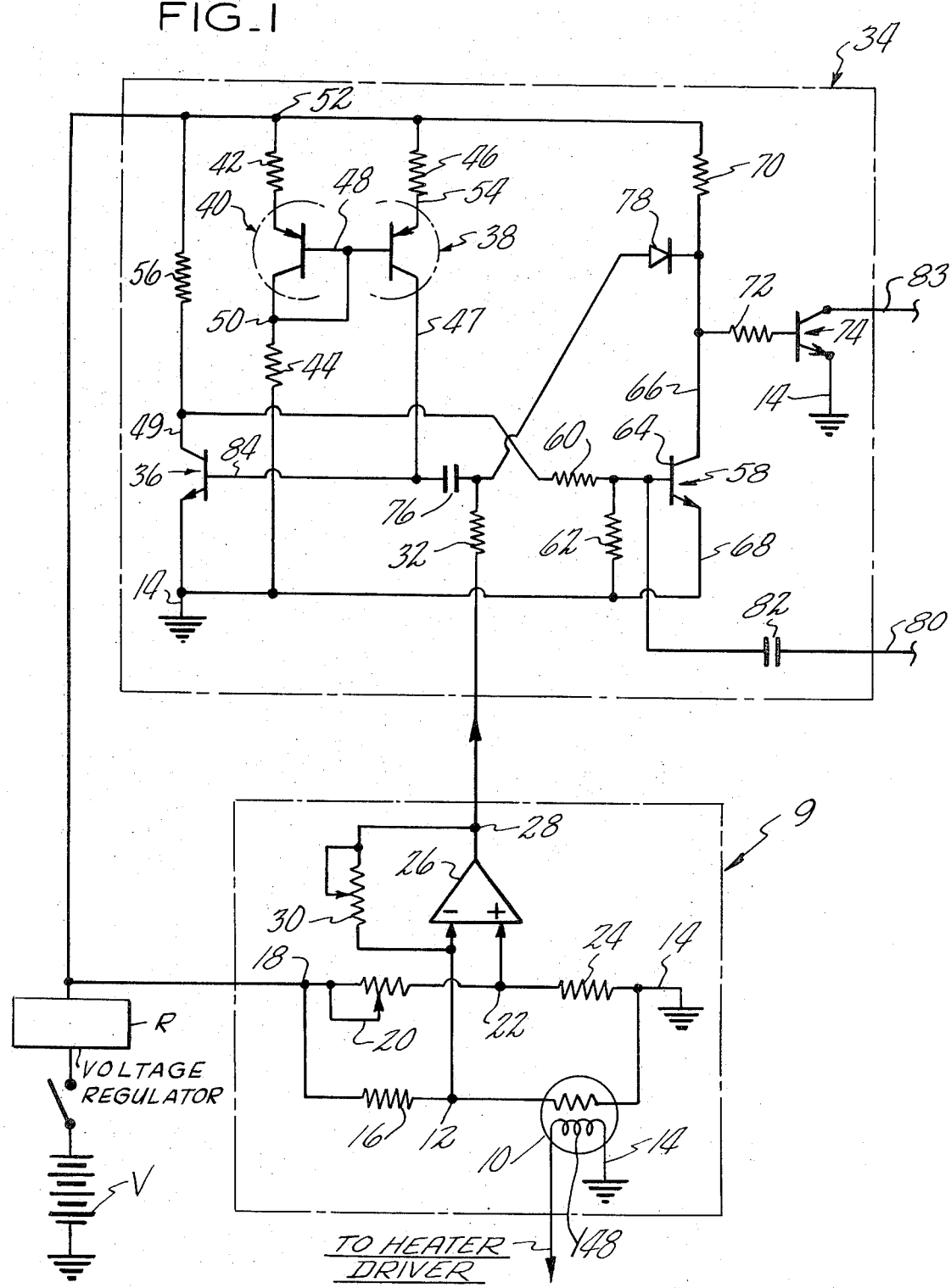
FIG. 1 is a schematic diagram of a thermistor scaling amplifier connected to a precision multivibrator.

Referring now to FIG. 1, a thermistor scaling amplifier 9 includes a thermistor 10, which is a temperature sensitive transducer whose resistance has a negative temperature coefficient. This thermistor 10 is connected from a terminal 12 to a ground terminal 14. A resistor 16, connected from the terminal 12 to a terminal 18, an offset potentiometer 20, connected from a terminal 22 to the terminal 18, a resistor 24, connected from the terminal 22 to the ground terminal 14, and the thermistor 10, form a bridge circuit. The bridge circuit is connected to a D. C. voltage source V, whose positive side is connected to the terminal 18 through a voltage regulator, R, and negative side connected to the ground terminal 14. The terminals 12 and 22 are the output terminals of the bridge and are connected to the inverting and non-inverting inputs respectively of a high gain operational amplifier 26. When the bridge circuit, described hereinbefore, is balanced, the input current to the amplifier circuit is substantially zero and the amplifier 26 output is substantially at the same potential as the terminal 22; that is to say, all of the current through the resistor 16 passes through, and is substantially the same as, the current through the thermistor 10. Increasing the temperature of the thermistor 10 causes its resistance to drop, thereby unbalancing the bridge. Within the linear range of operation of the amplifier 26, the inverting and non-inverting inputs of the amplifier 26 are always at virtually the same potential (determined by the voltage at the terminal 22). Therefore, a decrease in the thermistor 10 resistance causes current to flow from the output terminal 28 of the operational amplifier 26 through a gain potentiometer 30. This causes the operational amplifier output terminal 28 to become more positive while maintaining the voltage at the terminals 12 and 22 equal and unchanged. Similarly, a decrease of temperature causes an increase in thermistor 10 resistance and a reduction of voltage at the amplifier output terminal 28 so that current flows from the terminal 12 through the gain potentiometer 30, thereby enabling the terminals 14, 22 to remain substantially unchanged. The changes in the output of the amplifier 26 caused by the thermistor 10 resistance change hereinbefore described, are proportional to the resistance change. The potentiometers 20, 30 are not fixed resistors because it is desired that bridge balance at a particular temperature controlled by the offset potentiometer 20, and the amplifier 26 output voltage per unit change in thermistor resistance controlled by the gain potentiometer 30, be variable so that in the construction of a plurality of digital clinical thermometers a wide unit-to-unit variation of the thermistor 10 can be tolerated.

The output terminal 28 is connected to a resistor 32 of a precision monostable multivibrator 34. The monostable multivibrator is a circuit which can be made to depart from its single stable state for a precise interval of time. When the monostable multivibrator 34 is in its stable state, a transistor 36 is in conduction caused by base current from a constant current source comprised of a transistor 38, a transistor 40, a resistor 42, a resistor 44, and a resistor 46. The transistors 38, 40 are mounted on the same substrate, in the same physical package, so that the base-emitter junctions of the transistors 38, 40 wil be at substantially identical ambient temperatures. As will be explained hereinafter, the invariance of the constant current source with temperature depends upon the base-emitter junctions of the transistors 38, 40 having the same temperature coefficients and being at substantially identical temperatures. The common substrate construction of the transistors 38, 40 brings about this desired result.

The constant current output is from a collector 47 of the transistor 38 and is substantially the same as its emitter current. This is true because the transistor 38 is a high gain device, so that its base current is negligible and its emitter and collector currents are substantially equal. Since there is a wired connection from a base 48 and a collector 50, the transistor 40 is connected as a diode comprised of its base-emitter junction. It follows that the resistor 42, the base-emitter voltage drop of the transistor 40 and the resistor 44 are a voltage divider with components chosen so that the base current of the transistor 38 is negligible compared to the current through these components from a terminal 52 connected to the positive side of the D. C. voltage source. Furthermore, the voltage at the base of the transistors 38 will vary as the base-emitter voltage of the transistor 40 varies. Since the base-emitter voltage of the transistor 38 will vary by the same amount, because of similarity of construction and close proximity, the voltage at an emitter 54 of the transistor 38 remains constant with changes of ambient temperature. Therefore, the voltage across the resistor 46 remains constant with temperature and, since collector and emitter current of the transistor 38 are substantially the same, the current through the resistor 46 (the emitter current) being constant causes the collector current to be constant. The reasons for constructing a predictable constant current source will hereinafter be explained.

With the monostable multivibrator 34 in its stable state, current from the collector 47 causes the transistor 36 to saturate and current of the collector 49 of the transistor 36 causes the collector 49 to drop to substantially ground potential because the potential of the D.C. voltage source is dropped across a resistor 56. The collector 49 is connected to the base of a transistor 58 through a resistor 60. Since the collector voltage of the transistor 36 is at ground potential there can be no base current to the transistor 58 through the resistor 60.

A resistor 62 is provided between the base 64 of transistor 58 to the ground terminal 14 to prevent the transistor 58 from conducting current from its collector 66 to its emitter 68 due to collector to base leakage current and to help remove stored base charge when the transistor 58 base drive is removed, thereby enhancing its ability to rapidly cease the conduction of collector current. The collector 66 of the transistor 58, is connected to the terminal 52 through a resistor 70, and is at a potential substantially determined by the D. C. voltage source connected to the terminal 52, and a voltage divider comprised of the resistor 70 and a resistor 72, connected to the ground terminal 14 through the base-emitter junction of a transistor 74. The voltage at the terminal 28, designed to be always less than or equal to the voltage at the collector 66 while the precision monostable multivibrator 34 is in its stable state, is impressed upon a timing capacitor 76 and the anode of a diode 78 through a resistor 32. Since the diode 78 is reverse biased, there is no D. C. path for current through the resistor 32 so therefore, in the steady state, the voltage at either terminal of the resistor 32 must be equal to the output of the thermistor scaling amplifier 9 and no current will flow through it.

Collector to emitter conduction of the transistor 58 is caused by applying a positive pulse on a line 80 and coupling it through a coupling capacitor 82 to the base 64. This is how the precision monostable multivibrator 34 is triggered into an unstable state. The positive pulse on line 80 causes the collector 66 and the anode of the diode 78 to drop to approximately ground potential. Because it is not physically possible to change the charge on a capacitor instantaneously, the voltage across the capacitor 76 will, at the instant of the conduction of the transistor 58, be unchanged, causing the base of the transistor 36 to drop by the same voltage that the anode of the diode 78 had been caused to change by the conduction of the transistor 58. This causes the transistor 36 to cease conduction of collector current because the voltage of its base 84 is below the ground potential of its emitter 86. The constant current source will cause the timing capacitor 76 to charge until the transistor 36 conducts collector current, thereby causing the termination of the conduction of the transistor 58. The length of time of the conduction of the transistor 58 is precisely determined by the constant current source hereinbefore described, and the voltage which is proportional to the temperature of the thermistor 10, at the output terminal 28 impressed upon the timing capacitor 76. During the duration of the precision pulse or unstable state of the precision monostable multivibrator 34, the transistor 74 cannot conduct because the collector 66 is at ground potential, thereby not permitting a base input current into the transistor 74. At all other times, the transistor 74 will be in conduction from collector to emitter providing a sink for any current externally provided to an output line 83 of the precision monostable multivibrator 34. It is essential to the accuracy of the digital clinical thermometer, that over the range of temperatures of clinical interest, the precision monostable multivibrator 34 have a pulse width proportional to the voltage provided by the thermistor scaling amplifier 9 and thereby be proportional to temperature of the thermistor 10.

Figure 2:
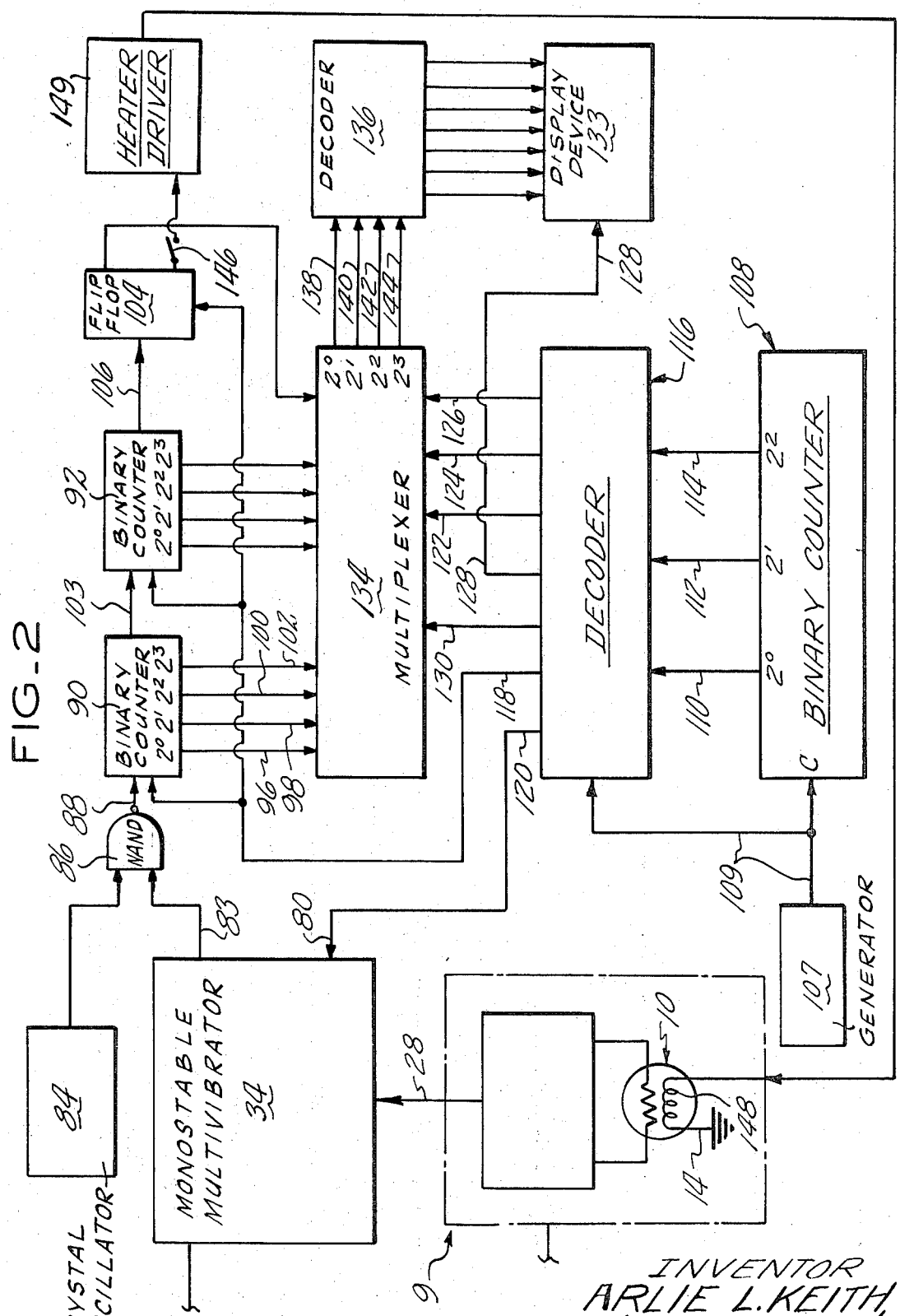
FIG. 2 is a schematic block diagram of the digital clinical thermometer.

Referring now to FIG. 2, the thermistor scaling amplifier 9 and the precision monostable multivibrator 34 are illustrated in cooperation with the remainder of the clinical digital thermometer.

FIG. 2 is a schematic block diagram wherein a crystal oscillator 84 provides a signal to one input of a two input nand gate 86. The other input to the nand gate 86 is provided by the output line 83 of the monostable multivibrator 34. At all times when the monostable multivibrator 34 is in its stable state, the output line 83 is at ground potential because it provides a sink for the NAND gate input current. Under this condition an output signal line 88 connected to the output of the NAND gate 86 is at about 3.5 volts, a value typical of many of the gating structures presently available. Using the terminology usually employed for gates and other digital devices, the discrete voltage level of about 3.5 volts will be referred to as a "logical one." During the time that the monostable multivibrator 34 is in its unstable state, the output line 83 provides essentially an open circuit to the NAND gage 86. During this time output line 88 is the inverse of the input provided by the crystal oscillator 84. That is to say, when the crystal oscillator 84 is at logical one, the output line 88 is at ground, referred to in the embodiment hereinafter as "logical zero." Similarly, when the crystal oscillator output is at a logical zero, the output line 88 is at one. Therefore, the NAND gate 86 generates a group of pulses which are the inverse of the pulses provided by the crystal oscillator 84 during the time that the monostable multivibrator 34 is in its unstable state.

Counters 90 and 92 are binary coded decimal counters of a type that respond to an input change from a one to a zero by causing the counter to change its state. The state of the counter 90 is defined by the ones and zeros appearing on four output lines 96, 98, 100, 102. Shown at the output terminals to lines 96, 98, 100, 102 is the weight given a logic one level at each output. The counter 90 sequence of states and the decimal equivalent of each state is shown in the table below. A change from a one to a zero on the line 88 causes the counter 90 to change its state.

| Output line: | 102 | 100 | 98 | 96 | Decimal equivalent of each state: |
|---|---|---|---|---|---|
| Weight of output: | $2^3$ | $2^2$ | $2^1$ | $2^0$ | |
| | 0 | 0 | 0 | 0 | 0 |
| | 0 | 0 | 0 | 1 | 1 |
| | 0 | 0 | 1 | 0 | 2 |
| | 0 | 0 | 1 | 1 | 3 |
| | 0 | 1 | 0 | 0 | 4 |
| | 0 | 1 | 0 | 1 | 5 |
| | 0 | 1 | 1 | 0 | 6 |
| | 0 | 1 | 1 | 1 | 7 |
| | 1 | 0 | 0 | 0 | 8 |
| | 1 | 0 | 0 | 1 | 9 |
| | 0 | 0 | 0 | 0 | 0 |

The counter 92 is identical to the counter 90 but is incremented by a transistion from the decimal equivalent 9 state to the decimal equivalent 0 state of the counter 90. At this transition, the output of the counter 90, provided on a signal line 103, changes from a logical one to a logical zero. It is obvious that the decade counters 90 and 92 count, in the usual sense, up to two decimal decades of pulses that are provided on the line 88. In this embodiment, the counter 90 provides the fractional portion of the temperature to be read and therefore has a weight of tenths of units. The counter 92 has the weight of units, a unit being 1° fahrenheit. It should be noted that in the measurement of the temperature of a live human subject, the tens digit will either be a nine or it will be a zero (when the subject's temperature is 100°F. or higher). Since the tens digit is a nine while the hundreds digit is a zero, and the tens digit is a zero while the hundreds digit is a one, are the only possible events and they are mutually exclusive, the representation of the tens and hundreds digit require only a flip flop 104 which is simply a device with two states, a "set" state and a "clear" state. The flip flop 104 changes its state when the counter 92 changes its state from 9 to 0. The transistion is accompanied by an output of the counter 92, provided on a signal line 106, changing from logical one to logical zero.

It is apparent that the number of pulses from the crystal oscillator 84 that will be counted is proportional to the time that the monostable multivibrator 34 is in its unstable state— which is proportional to temperature. If this were the sole means of accumulating a count in counters 90, 92 and the flip flop 104, then approximately 1,000 pulses would be required to cause a counter state comparable to the temperature of a human subject. Assuming 0.5 percent linearity of the monostable multivibrator 34 and the thermistor scaling amplifier 9, temperaure errors of of 0.5°F. would be expected and this would be intolerable. This limitation is minimized by presetting the counters 90, 92 and the flip flop 104 to the equivalent of a temperature of 94.0°F. prior to each temperature measurement. Since the number of pulses to be counted is thereby reduced by a factor of about 20, the accuracy correspondingly increases by the same factor. The presetting and other operations required for obtaining a human subject's temperature in digital form will hereinafter be described.

In programming the order of operations performed by the digital circuitry, a low frequency square wave generator 107 having a frequency of about 2 hertz is connected to cause a binary counter 108 to count the pulses from the generator 107 and the states of the counter 108 are used to sequentially signal operation of other portions of the thermometer. In the operation of the counter 108, a transition from a logical one to a logical zero on a signal line 109 causes it to change its state on output lines 110, 112, 114. The weight of a logical one at each output to lines 110, 112, 114 is shown in FIG. 2. There are eight distinct states defined by the logic levels at the lines 110, 112, 114, and it is these that are used to signal action by other portions of the circuit. The counter 108 states are shown in the following table depicting the sequence caused by pulses from the generator 107. Each state is conveniently assigned a decimal number consistent with a decimal equivalent of the binary output of the counter 108. Also shown is the operation name that will hereinafter be associated with each state.

| Output Terminal | | | State | Operation |
|---|---|---|---|---|
| 110 | 112 | 114 | Number | Name |
| 0 | 0 | 0 | 0 | Hundreds Select |
| 0 | 0 | 1 | 1 | Tens Select |
| 0 | 1 | 0 | 2 | Units Select |
| 0 | 1 | 1 | 3 | Decimal Point Select |
| 1 | 0 | 0 | 4 | Fractions Select |
| 1 | 0 | 1 | 5 | Temperature Counter Preset |
| 1 | 1 | 0 | 6 | |
| 1 | 1 | 1 | 7 | Start Monostable |
| 0 | 0 | 0 | 0 | Hundreds Select |

In order to utilize the different states of the binary counter 108 to signal an action by other portions of the system, the event of the counter 108 being in any given state must be available in a disjunctive form. That is to say, it is most convenient to have as many outputs as there are states required to signal an action, and have a state identified with a logical one level on one of these outputs. A way of attaining the state of the binary counter 108 disjunctively, is to use a decoder 116. with outputs line 118, 120, 122, 124, 126, 128, 130. Each corresponds to a state of the conter 108 so that when one line 118, 120, 122, 124, 126, 128, 130 is at logical one, all others are at logical zero. At the time that the binary counter is at a state represented by the state number five in the preceding table, the output line 118 is at a logical one level, causing a presetting of the counters 90, 92 and the flip flop 104 to a count representative of 94.0°F. In order to space the signalling of events, none of the decoder 116 output lines can be at a logical one level when the output of the generator 107 is at a logical zero level. This is accomplished by applying the signal on the line 109 to an input of the decoder 116 which has digital logic circuitry which causes all output lines 118, 120, 122, 124, 126, 128, 130 to be at a logical zero level when the line 109 is at a logical zero level. Therefore, a frequency of the generator 107 of 2 hertz and a change of state of the counter 108 causes all of the decoder 116 output lines to go to a logical zero and there is a 0.25 second delay before a logical one level appears at one of the lines 118, 120, 122, 124, 126, 128, 130. A transition from a logical one to a logical zero of the generator 107 causes the binary counter 108 to change from its stae numbered five to its state numbered six; the event is ignored and causes no action by any of the cooperating elements of the embodiment. The following pulse from the generator 107 causes the binary counter 108 to change to its state numbered seven. This causes a logical one at the line 120, which triggers the precision monostable multivibrator 34 into its unstable state and enables the counting of pulses from the crystal oscillator 84 by the counters 90, 92 and the flip flop 104 proportional to the thermistor 10 temperature. If the subject's temperature were 98.6°F., obviously 46 pulses would be required to attain this reading, since the preset temperature level was 94.0°F., corresponding to the counter 92 being preset to a count of four and the counter 90 and the flip flop 104 being preset to counts of zero.

After the counters 90, 92 and the flip flop 104 have been first preset (counter 108 state number six) and then loaded in response to the oscillator 84 pulses gated by the precision monostable multivibrator 34, the temperature information required for a digital readout is stored by the countes 90, 92 and the flip flop 104. This information is read serially on a display device which in this embodiment is a solid state seven segment display device 133. When the counter 108 changes its state from state numbered seven to state numbered zero, a logical one level at the output line 122 causes a multiplexer 134 to signal a seven segment decoder 136 to illuminate the segments that cause the appearance of the numeral one if the flip flop 104 is "set" (has been caused to change its state after being cleared when the counter 108 was in state numbered five) or alternately causing no segments to be illuminated if the flip flop 104 is in its "clear" state. The numeral one is caused to appear by digital logic circuitry internal to the multiplexer 134 causing a logical one at an output line 138 and logical zero at output lines 140, 142, 144. The flip flop 104 being "set" causes the lines 138, 140, 142 and 144 to be simultaneously at a logical one level, the condition for all segments of the device 133 to remain extinguished; this is always the condition when the counter 108 is in states five, six, and seven, and when the line 109 is at a logical zero level. After the counter 108 goes from its state numbered zero to its state numbered one, the decoder output line 124 goes to a logical one level and the output line 122 returns to a logical zero level signalling the multiplexer 134 to again examine the flip flop 104 and cause the seven segment decoder 136 to illuminate those segments of the display which cause a numeral nine to appear if the flip flop 104 is clear. If it is set, a numeral zero is caused to appear (corresponding to a temperature greater than 100.0°F.). Digital logic circuitry internal to the multiplexer 134 causes a logical one to appear on lines 138, 144 in the event the flip flop 104 is clear and causes logical zero on lines 138, 140, 142, 144 if it is set. The next pulse of the generator 107 causes the counter 108 to go to its state numbered two and the output line 126 to go to the logical one level. A logical one level at line 126 causes the counter 92 to be connected to the seven segment decoder 136 so that the binary coded decimal number stored in the counter 92 is applied to the seven segment decoder which causes it to appear on the segment display. The succeeding pulse from the generator 107 causes the counter 108 to go from its state numbered two to its state numbered three causing a logical one to appear at the line 128, which illuminates the decimal point of the display device 133. The following pulse from the generator 107 causes the counter 108 to go to its state numbered four which causes a logical one at line 130. The multiplexer 134 causes the binary coded decimal number stored in the counter 90 to be decoded by the seven segment decoder 136 and be illuminated by the segments of the display device 133. The next pulse from the generator 107 causes the counter 108 to go to state number five, thereby initiating an iteration of the sequence of events hereinbefore described.

As explained hereinbefore, at states five, six, and seven of counter 108 there is never a display upon the seven segment display device 133, thereby causing a substantially greater interval of time between the last number displayed in a temperature reading and the first number of a succeeding reading than the interval between successive numbers of elements of a single temperature reading. Varying the frequency of the generator 107 allows adjustment of the display speed to suit the individual user. The serial readout, therefore, presents no severe handicap of interpretation due to proximity of successive measurements.

When the thermometer is in its standby mode a switch 146 is closed, connecting the "clear" output of the flip flop 104 to a heater 148 through a heater driver 149 whereby the thermistor 10 is heated. The thermistor 10 being at a temperature of 100.0°F. (or higher) causes the flip flop 104 to be set — deenergizing the heater. It should be noted that the heater 148 is also energized when the counter 108 is in state numbered five. Therefore, when the invention is practiced, the thermometer will be in the range of temperature to be measured, thereby shortening the time for the thermometer to go from its heated temperature to the temperature of a human subject. All that is necessary to measure temperature is to disconnect the heater 148 with switch 146 and place a thermistor probe in the patient's mouth or rectum. One such probe is shown in U. S. Pat. No. 3,025,706.

If it is desired that only clinical temperatures be displayed on the display device 133, an additional switching means is provided to automatically open lines 138, 140, 142 and 144 and to ground line 128 when the switch 146 is positioned to heat the heater 148. This can be by mechanical switches operated by switch 146. The opening of the lines 138, 140, 142 and 144 causes logical one to appear at the display device 133 and the grounding of line 128 causes a logical zero to appear. A logical one on lines 138, 140, 142 and 144 and a logical zero on line 128 is inconsistent with the display of any digit or symbol and does not cause any portion of the display device 133 to be illuminated.

I claim:

1. Apparatus for providing a visual representation of the resistance of a variable resistance transducer, comprising:

a variable resistance transducer circuit having said transducer connected thereto, said transducer circuit providing a sense signal having an amplitude that changes in proportion to changes of the reistance of said transducer;

a source of timing signals;

a monostable multivibrator connected to said timing source and to said transducer circuit, said multivibrator having an unstable state in response to a timing signal, said unstable state having a duration which is proportional to the sense signal amplitude;

pulse generating means connected to said multivibrator for providing a group of pulses in response to the unstable state, the number of pulses of said group being proportional to the duration of said unstable state; and counting means responsive to said pulse generating means for providing a visual representation of the number of pulses of said group.

2. Apparatus according to claim 1 additionally comprising means responsive to said counting means for causing the resistance of said transducer to change to cause said group to have a known number of pulses.

3. Apparatus according to claim 2 wherein said variable resistance transducer includes a temperature sensitive resistor and said means responsive to said counting means comprises:

a heater to raise the temperature of said temperature sensitive resistor; and switching means for disconnecting and connecting said heater and said counting means.

4. Apparatus according to claim 2 wherein said counting means comprises a display device, said switching means disconnecting said display device when said heater is connected to said counting means.

5. Apparatus according to claim 1 wherein the duration of said unstable state is representative of the difference in the resistance of said transducer from a known resistance, said counting means providing a representation of an accumulated count equal to the number of pulses of said group added to a preset count.

6. Apparatus according to claim 5 wherein said counting means comprises a display which provides a serial visual output of digits representative of said accumulated count.

7. Apparatus according to claim 6 wherein a time interval between the visual output of a first digit of a group of digits representative of an accumulated count and the last digit of a group of digits representative of the previous accumulated count is greater than a time interval between the visual output of the visual digits of a group.

* * * * *